(12) United States Patent
Le Roux et al.

(10) Patent No.: US 6,618,438 B1
(45) Date of Patent: Sep. 9, 2003

(54) MPEG STREAM SWITCHING PROCESS

(75) Inventors: Jean Le Roux, Rennes (FR); Claude Chapel, Rennes (FR); Jean-Charles Guillemot, Thorigne Fouillard (FR)

(73) Assignee: Thomson Licensing S.A., Boulogne Cedex (FR)

( * ) Notice: Subject to any disclaimer, the term of this patent is extended or adjusted under 35 U.S.C. 154(b) by 0 days.

(21) Appl. No.: 09/596,106

(22) Filed: Jun. 16, 2000

(30) Foreign Application Priority Data

Jun. 18, 1999 (FR) ............................................. 99 07713

(51) Int. Cl.$^7$ .......................... H04N 5/268; H04N 7/50; H04N 7/52
(52) U.S. Cl. ............. 375/240.12; 348/705; 375/240.26; 375/240.28; 386/52; 386/112
(58) Field of Search ...................... 375/240.12, 240.26, 375/240.28; 386/52, 112; 348/705; H04N 7/50, 7/52, 5/268

(56) References Cited

U.S. PATENT DOCUMENTS

| | | | | |
|---|---|---|---|---|
| 5,602,592 A | * | 2/1997 | Mori et al. | 375/240.12 |
| 5,859,660 A | | 1/1999 | Perkins et al. | 725/32 |
| 6,049,569 A | * | 4/2000 | Radha et al. | 375/240.12 |
| 6,370,199 B1 | * | 4/2002 | Bock et al. | 375/240.28 |
| 6,414,999 B1 | * | 7/2002 | Igi et al. | 375/240.12 |

FOREIGN PATENT DOCUMENTS

| | | | |
|---|---|---|---|
| EP | 0920218 A2 | 6/1999 | H04N/7/52 |
| GB | 2328099 | 2/1999 | H04N/7/50 |
| WO | WO98/54910 | 12/1998 | H04N/7/58 |
| WO | WO99/30503 | 6/1999 | H04N/7/24 |

OTHER PUBLICATIONS

Wee, et al., *Splicing MPEG Video Streams in the Compressed Domain IEEE Workshop on Multimedia Signal Processing*. Proceedings of Signal Processing Society Workshop on Multimedia Signal Processing, XX, XX, Jun. 23, 1997, pp. 225–230 XP002081482.

Hurst, et al., *Splicing MPEG—Tutorial and Proposee SMPTE Standard*, Proceedings of the SMPTE Technical Conference, XX, XX, XP–002098562, Nov., 1997, pp. 105–117.

*List of References Preliminary Search Report and Priority Documen.*

* cited by examiner

Primary Examiner—Howard Britton
(74) Attorney, Agent, or Firm—Joseph S. Tripoli; Ronald M. Kurdyla; Guy M. Eriksen

(57) ABSTRACT

The process is characterized in that, if: $DTS\_next\_AUold-PCRold < DTS\_first\_AUnew-PCRnew$, then, in a first step, the data of one or more last images of the old stream and/or one or more first images of the new stream are replaced by data of one or more new pre-encoded images of which the number is smaller so that the new value of PCRold and/or PCRnew thus obtained satisfies the relation:

$$DTS\_next\_AUold-PCRold \geq DTS\_first\_AUnew-PCRnew,$$

in a second step, TS stuffing packets are inserted between the point of exit and the point of entry so as to make the decoding instants $DTS\_next\_AUold$ and $DTS\_first\_AUnew$ coincide. Applications relate to the transmission and storage of programs, as well as to the insertion of advertisements or to regional or local handover.

11 Claims, 1 Drawing Sheet

MPEG STREAM SWITCHING PROCESS

BACKGROUND OF THE INVENTION

1. Field of the Invention

The invention relates to a process for switching MPEG streams, for example video sequences or program segments coded according to the MPEG standard, the acronym standing for the expression Motion Picture Expert Group.

2. Description of the Related Art

Films or video sequences are nowadays commonly stored in compressed form, so as to reduce the memory capacities required. Switchings of sequences are then performed not in baseband but directly on the basis of the MPEG coded data streams. Thus, successive video sequences are broadcast or one sequence is inserted into another sequence through the use of digital data stored in compressed form. A first stream of compressed video data corresponding to a first sequence of images, and referred to as the old stream, is followed, starting from a given point referred to as the switching point, by a second stream of compressed video data which is referred to as the new stream and corresponds to a second sequence of images.

The switching from one data stream coded according to the MPEG standard to another data stream coded according to this standard is beset with a number of problems in the area of the switching point.

Management of the buffer memory of the decoder is performed, in the MPEG standard, on the basis of modeling referred to as a virtual memory. Indeed, the coding of each image constituting a sequence is not carried out at constant cost and a buffer memory at the output of the coder is used to deliver a data stream at constant mean bit rate. On the decoder side, a buffer memory is also required so as to deliver, from the constant bit rate data stream, variable-cost images. Management of the buffer memory of the decoder is performed on the basis, among other things, of the clocks transmitted by the coder in the data stream and of the tags allocated to the images transmitted and defining the instant of exit from the memory of the decoder, the time gap between the instant of storage of an image in the memory of the coder and the instant of reading of the memory of the decoder having to be the same for each image.

This involves the PCR clock, standing for Program Clock Reference in the MPEG standard, which is a time cue transmitted in the data stream and on the basis of which the synchronization of the decoder is performed.

This also involves the DTS tag, standing for Decoding Time Stamp in the MPEG standard, which is a field transmitted in the stream and which indicates the instant at which an image is to be decoded in the decoder.

A first problem arises concerning the management of the memory of the decoder, owing to the fact that the number of bits per image (or frame) is not fixed. The state of the buffer memory varies over time and upon switching, the elements taken into account by the new stream for the management of this memory correspond to a state of fill of the memory which is different from the actual state corresponding to the old stream. This may result in saturation of the memory entailing image loss or a voiding of the memory creating a freeze-frame for example.

A second problem concerns the synchronization as regards the decoding and display of the images. The tags contained in the data streams relate to clocks specific to each stream (namely to a specific PCR) and the instants of decoding and display of the images need to be resynchronized.

Another problem is related to the very coding of the images. The various types of codings called upon by the MPEG standard are:
- intra coding (I image) making reference to no preceding or following image,
- inter coding of predictive type (P image) which may call upon a preceding reference image,
- inter coding of bi-directional type (B image) which may call upon a preceding reference image and/or upon a following reference image.

The images are grouped together into a GOP or Group Of Pictures as it is called. The first of a GOP, when considering the order of transmission, is an image of intra type and the first few succeeding images of type B may call upon images of the same GOP, which is then a closed GOP, or else upon images of the same GOP and of the preceding GOP, which is then an open GOP.

The problem arises when the stream of data following the switching point begins with an open GOP. This is because the decoding of the compressed images of the first GOP of this second stream may require, if this is an open GOP, the utilization of images of the preceding GOP. The preceding GOP corresponding to a stream of data of another sequence, the decoded images corresponding to this open GOP will exhibit defects. These defects are generally highly visible and are due to the utilization, for the decoding of these first few images of type B of the second sequence, of a different reference image from that which was used for the coding. The image blocks constituting the image or the images of the open GOP which are coded in bi-directional mode are image blocks coded in inter mode on the basis of a P- or I-type reference image of the preceding GOP for the same image sequence. The decoding of the blocks coded in inter mode, blocks composed of residuals or of prediction errors, for the first few images of bi-directional type after the switching point, will utilize different blocks from those which served in calculating these inter-coded residuals blocks. The reference image taken into account at decoding level will in fact be an image of the old stream, and hence different from the image taken into account at coding level. Very annoying block effects consisting of the displaying of erroneous image blocks will therefore appear in the first few images of the second sequence.

A partial solution to these problems exists and is known to be described in the MPEG II standard (part 1: Systems, paragraph 2.4 and appendix K). This involves incorporating, within the system layer, information relating to possible switching points (referred to as "splicing points" in the standard) for which the transport stream has favorable characteristics, allowing decoding of the images without the defects cited above (for example by using closed GOPs). It will then be possible for switching to be performed at these points only. Of course, this information must be incorporated into the data stream right from the coding of the images and it is no longer possible to incorporate it thereafter other than by carrying out a new decompression and compression of the data.

A permitted switching point, at the start of a GOP, adds a constraint on the coding of the first few images of this GOP, which are coded in bi-directional mode, this GOP having to be closed. These images can no longer use, as reference images, preceding images but only succeeding images and they are therefore forced into monodirectional mode.

The use of closed GOPs, hence the coding of the first two B images following an I image on the basis of the following P image (order of coding) and of the one I image (instead of the preceding P image of the preceding GOP), it then being possible to regard these B images as P images, severs the regulating of the coder on the basis of the states of the buffer memory and hence degrades the quality of the images, on account of a higher coding cost. To give an order of magnitude, the images of P type have a coding cost which is about twice as high as that of the images of B type.

This MPEG II coding compatible with stream switchings is not ordinarily used for coding films or video sequences. There are at present very few products on the market which force closed GOPs for the requirements of switching, the constraints induced in respect of bit rate regulation at coder level being an annoyance. Moreover, a priori determination of whereabouts a closed GOP must exist in the data stream, that is to say prediction of whereabouts in the sequence the cuts will be, presupposes that one knows the future uses of the sequences. Otherwise, it would be necessary to produce closed GOPs exclusively, although one wishes to utilize only a very small number of them.

The drawbacks generated by this solution are therefore, among others:

- lack of flexibility, the switchings being limited to predetermined switching points (or splice points),
- reduction in the rate of compression of the video data due to the insertion of the switching points which have to be sufficiently numerous in the data stream as to allow a minimum flexibility, even though most of these points will not be utilized,
- decoding and recoding required for the data streams which do not possess this stream switching compatibility at the outset, with all the problems related to re-storage, to image quality etc.,
- risk of severe restrictions as regards bit rate regulation, perhaps going so far as a loss of image quality, if a large number of switching points is introduced.

SUMMARY OF THE INVENTION

The purpose of the present invention is to alleviate the aforesaid drawbacks.

It relates to a process for switching from an old MPEG data stream to a new MPEG data stream so as to obtain a switched stream, the point of exit in the old stream corresponding to the end of a data packet of a TS stream relating to the last image of the old stream and the point of entry in the new stream corresponding to the start of a data packet relating to the first image of the new stream, characterized in that, PCRold (Program Clock Reference) and PCRnew being the clock instants relating respectively to the point of exit and point of entry, DTS_next_AUold (Decoding Time Stamp) and DTS_first_AUnew corresponding respectively to the calculated instant of decoding of the image following the last image of the old stream and the calculated instant of decoding of the first image of the new stream, if:

$$DTS\_next\_AUold-PCRold<DTS\_first\_AUnew-PCRnew,$$

then, in a first step, the data of one or more last images of the old stream and/or one or more first images of the new stream are replaced by data of one or more new pre-encoded images of which the number is smaller so that the new value of PCRold and/or PCRnew thus obtained satisfies the relation:

$$DTS\_next\_AUold-PCRold\geq DTS\_first\_AUnew-PCRnew,$$

in a second step, TS stuffing packets are inserted between the point of exit and the point of entry so as to make the decoding instants DTS_next_AUold and DTS_first_AUnew coincide.

It also relates to a process for switching from an old MPEG data stream to a new MPEG data stream so as to obtain a switched stream, the point of exit in the old stream corresponding to the end of a data packet of a TS stream relating to the last image of the old stream and the point of entry in the new stream corresponding to the start of a data packet relating to the first image of the new stream, characterized in that, PCRold (Program Clock Reference) and PCRnew being the clock instants relating respectively to the point of exit and point of entry, DTS_next_AUold (Decoding Time Stamp) and DTS_first_AUnew corresponding respectively to the calculated instant of decoding of the image following the last image transmitted of the old stream and the calculated instant of decoding of the first image of the new stream, if:

$$DTS\_next\_AUold-PCRold<DTS\_first\_AUnew-PCRnew,$$

then, in a first step, the instant of decoding DTS_first_AUnew of the first image of the new stream is modified to the value DTS_next_AUold plus n times the image period, n being equal to:

$$1+INT[((DTS\_first\_AUnew-PCRnew)-(DTS\_next\_AUold-PCRold))/(image\ period)];$$

INT corresponding to the integer part, in a second step, TS stuffing packets are inserted between the point of exit and the point of entry so as to make the decoding instants DTS_next_AUold and DTS_first_AUnew coincide modulo the image period.

According to a particular embodiment, the process is characterized in that the modification of the instant of decoding of the images of the new stream is performed by allocating a corresponding offset to the DTS tag and to the PCR clock for the new stream.

According to a particular embodiment, the process is characterized in that n pre-encoded images are inserted before the first image of the new stream, whose size and whose allocated tags allow their decoding during the DTS instants skipped by the first image of the new stream.

According to a particular embodiment, stuffing packets are inserted into the stream so as to make the instants of decoding of the images inserted correspond to the skipped DTS instants.

According to a particular embodiment, the cost of the replacement pre-encoded images in the new stream is such that the number of bits of the new stream entering the memory of the decoder between the instant PCRnew and the instant DTS_first_AUnew-(image period) is less than or equal to the number of bits of the old stream which would have been stored in the memory of the decoder between the instant PCRold and DTS_next_AUold-(image period).

By virtue of the invention, a simple implementation of stream switching is possible, yielding, in baseband, a correct transition from one sequence to the other even though the MPEG data streams are not made compatible with such switchings by the addition of switching points. It is thus unnecessary to use high-cost equipment to carry out such switchings, for example, when inserting advertisements etc.

High flexibility and high quality of stream switching are obtained as regards the switching points.

DETAILED DESCRIPTION OF THE PREFERRED EMBODIMENT

Figure 1:
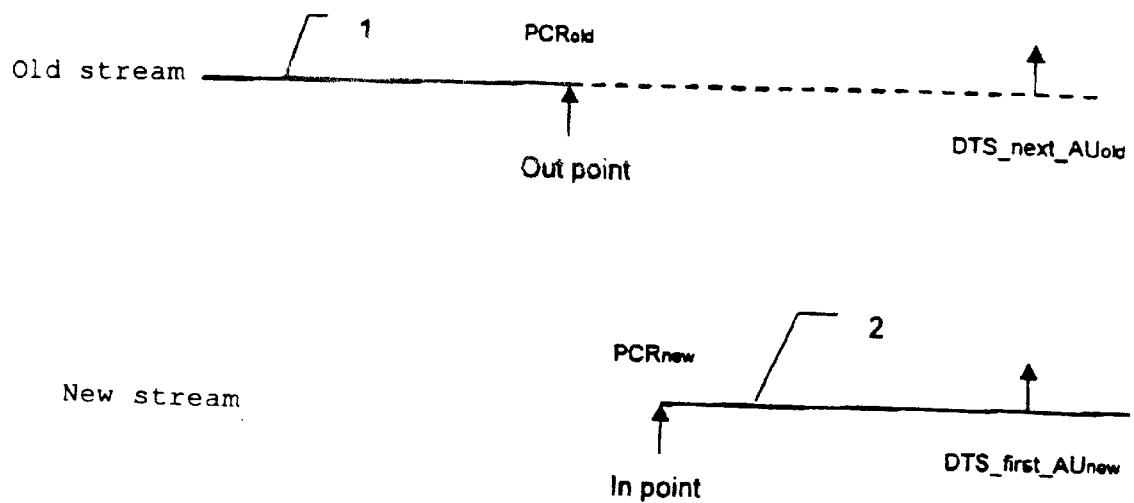
FIG. 1 represents, for an upper line, an old data stream.

The main conditions to be complied with, to obtain correct stream switching for data streams which do not possess switching compatibility, relate to:

- the location of the cutoff points of the old stream or points of exit and the location of the points of entry of the new stream
- the synchronization of the signals and clocks if one wishes to obtain discontinuity-free display of the images
- the management of the filling of the memory of the decoder so as to prevent overflows or voidings.

Location of the Switching Points
Conditions Relating to the Points of Entry of the New Stream:

All the starts of GOP can be regarded as points of entry, provided that the GOPs are closed GOPs. This is because, in this case, the first image to be decoded is an intra-coded image and the following images of type B are not coded on the basis of a reference image lying within the preceding GOP.

In the case where the GOP is an open GOP, the point of entry can also be the start of a GOP on condition that, in the transport stream TS, the packets corresponding to the images coded on the basis of the reference images lying in the preceding GOP are replaced by new packets corresponding to a coding which is independent of these images (see later, replacement of images of type B). The French patent application filed by the applicant on Aug. 14, 1998 under the reference 9810432 also explains the implementation of such a process.

Of course, if one wishes to access any start of GOP whatsoever, these latter must be likened to sequences. It is in fact necessary to decode the sequence header so as to be able to decode the GOPs making up this sequence, so as to know for example the format of the images (4/3 or 16/9), the compression rate etc. One solution, in accordance with MPEG coding, is therefore to artificially create one sequence per GOP, that is to say to introduce one sequence header per GOP thereby slightly increasing the bit rate but making it possible to increase the number of random access points.

Conditions Relating to the Points of Exit of the Old Stream:

The exit points must lie either in front of a type I image or in front of a type P image. This is because, in these cases, all the images preceding this point of exit will be displayed and there is therefore no risk of receiving a coded image which is not to be displayed and hence of having an image remaining in the buffer memory of the decoder. The converse case can occur if the coded image following the last image transmitted corresponds, when one considers the order of display rather than the order of coding, to a preceding image, for example during a cut after a type P coded image.

Synchronization of the Signals

Hereinafter, the initials PCR, standing for Program Clock Reference as it is called in the MPEG standard, will be used to designate the clock reference relating to a data stream and hence to a sequence. The PCR cue present in the TS transport stream is used by the decoder to calculate the time. The PCR therefore delivers the time reference system at the coder level.

Also, the initials DTS, standing for Decoding Time Stamp, will be used to designate the time tag assigned to an image. The DTS gives the decoding time slots, that is to say the instant at which the image is to be read from the buffer memory of the decoder and decoded.

The PCR and DTS cues are transmitted respectively in 188-byte packet headers of the TS transport stream and in packet headers of the PES stream (the initials standing for Packetized Elementary Streams), the first packetization step required for producing a TS transport stream.

The initials PTS stand for Presentation Time Stamp, which correspond to the instant of display of the image and allows the images to be reordered after decoding; it is present in the packet headers of the PES stream.

These initials will be given the suffices old or new depending on whether they belong to the old stream or to the new stream.

FIG. 1 represents, for the upper line referenced 1, the old data stream. The arrow labeled "outpoint" represents the point of exit of the old stream relating to the instant PCRold. This cue PCRold corresponds to the first byte of the first untransmitted image of the old stream. From this point onwards, the old stream (not transmitted) is represented dashed as is the location relating to the instant of decoding of the image (not transmitted) following the last image transmitted by this old stream (DTS_next_AUold).

The lower line referenced 2 represents the new stream. The arrow labeled "inpoint" represents the point of entry of the new stream relating to an instant PCRnew. This cue PCRnew, transported by the first packet of the first image of the new stream, corresponds to the first byte of this first image. The arrow labeled DTS_first_AUnew represents the instant of decoding of the first image of the new stream in the corresponding reference system, that is to say in relation to the clock PCRnew.

If one desires defect-free switching, the first image of the new stream must be decoded at an instant DTS which must be equal to the instant of decoding of the last image of the old stream incremented by 40 ms. Now, the PCRs of the two streams are asynchronous and hence a priori there is no reason for the decoding to fall 40 ms afterwards.

The solutions herein-below are proposed so as to carry out such synchronization.

Figure 2:
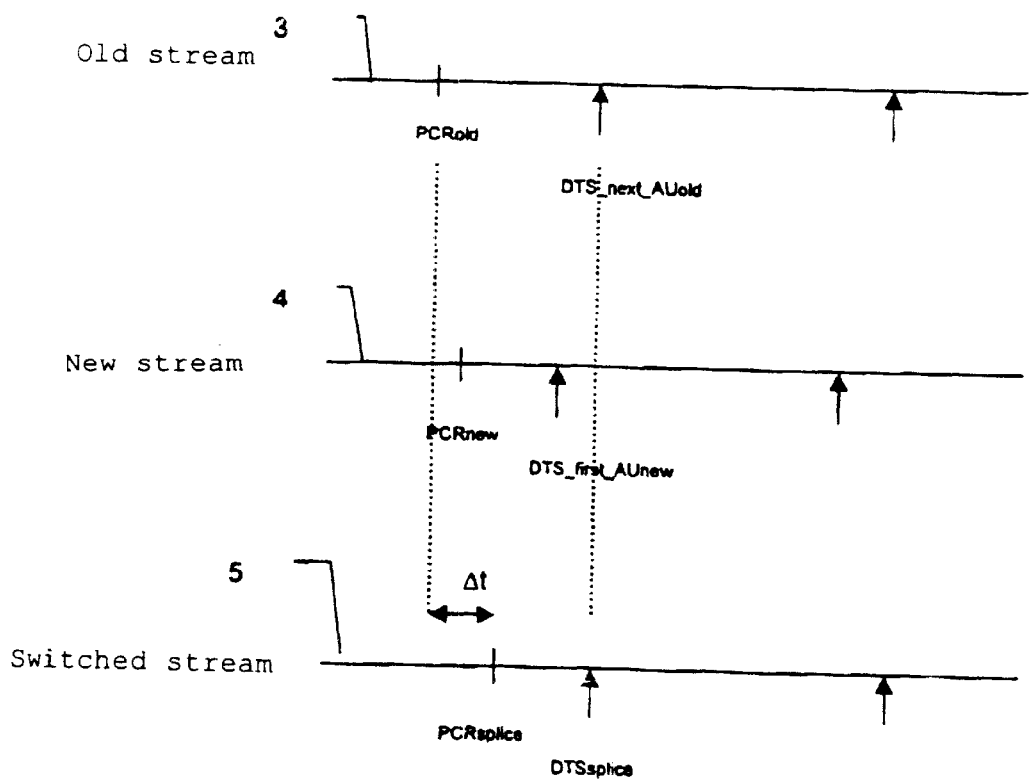
FIG. 2 describes the synchronization of the streams on switching from an old stream over to a new stream to give a switched stream.

FIG. 2 describes the synchronization of the streams on switching from an old stream referenced 3 over to a new stream referenced 4 to give a switched stream referenced 5.

The value DTS of the switched stream, dubbed DTSsplice in curve 5, must correspond to that DTS_next_AUold of the old stream in order to obtain defect-free switching.

It is by instituting an idle time At before switching over to the new stream, hence between the instants PCRold and PCRnew or, stated otherwise, by positioning the instant PCRnew of the new stream with respect to the instant PCRold, on the basis of the comparison between DTS_next_AUold−PCRold and DTS_first_AUnew−PCRnew, that this synchronization is carried out, when this is possible.

The first expression corresponds to the duration between the switching instant PCRold for the old stream and the instant of decoding of the image following the last image transmitted before switching, that is to say the value DTS_next_AUold.

The second expression corresponds to the duration between the switching instant PCRnew for the new stream and the instant of decoding of the first image of the new stream, that is to say the value DTS_first_AUnew. This is in fact the duration of residence of the first image of the new stream in the memory of the decoder from the instant of reception and storage of the first byte of the image up to the instant of decoding of this same image (the model presupposes instantaneous decoding for an image).

First Case $$DTS\_next\_AUold-PCRold \geq DTS\_first\_AUnew-PCRnew,$$

Switching with synchronization is possible, with no particular precaution in the case of equality, by adding an idle time in the case of inequality. This idle time is calculated in such a way as to make the DTS of the next image (not transmitted) of the old stream correspond with the DTS of the first image transmitted of the new stream.

This idle time is produced by inserting TS stuffing packets between the instants PCRold and PCRnew. The number of stuffing packets required to correspond to the idle time is calculated. The error is therefore less than the duration of a packet, this corresponding to a few hundred microseconds for a bit rate of the order of 10 Mbits and is therefore negligible compared with 40 ms.

We then have, if DTSsplice corresponds to the instant of decoding of the first image of the new stream and PCRsplice the instant of reception of the first byte of the first image of the new stream:

$$DTSsplice=DTS\_next\_AUold$$

$$PCRsplice=PCRnew+DTS\_next\_AUold-DTS\_first\_AUnew$$

As regards the time reference system, it should be pointed out that the passage, in the switched stream, from the reference system of the old stream to the reference system of the new stream takes place after reception of the stuffing packets hence at the first image of the new stream:
- either by virtue of a PCR break indicator making it possible to pass from the PCR value obtained at the end of the stuffing packets (PCRsplice) to the value PCRnew,
- or by assigning an offset to the value PCR obtained at the end of the stuffing packets (PCRsplice), this offset being equal to the difference between PCRnew and this value PCRsplice.

Second Case:

$$DTS\_next\_AUold-PCRold<DTS\_first\_AUnew-PCRnew,$$

Here, synchronization seems to be impossible, the instant of decoding of the first image of the new stream being able to occur only after the instant of decoding of the next image (not transmitted) of the old stream.

The solution proposed here is to "skip" one or more decoding instants DTS and hence to decode the first image of the new stream at the instant DTS_next_AUold plus an integer n of image periods (40 ms), rather than at the instant DTS_next_AUold.

Given that two successive values of DTS are spaced one image period apart, this decoding instant DTSsplice will therefore be chosen such that:

$$DTSsplice=DTS\_next\_AUold+\{1+INT[(DTS\_first\_AUnew-PCRnew)-(DTS\_next\_AUold-PCRold)]/(image\ period)]\} \times (image\ period)$$

INT being the integer part of the division.

The value of PCRsplice is then:

$$PCRsplice=PCRnew+DTS\_next\_AUold-DTS\_first\_AUnew$$

The shifting of the instant of decoding of the first image of the new stream by n image periods with respect to the instant DTS_next_AUold generates an "idle time" which could be filled with stuffing packets. An idea of the invention consists in inserting pre-encoded images into the stream, thus making it possible to decode an image at each image period, thus reducing the switching defects. These pre-encoded images are decoded at DTS instants "skipped" by the first image of the new stream. The stuffing packets are added, as indicated in the above case, so as to allow synchronization at the DTS instants.

The coding of the image or of the images inserted is dependent on the "idle time" available. It involves, for example, coding black images, blue images or type P images, images pre-encoded according to particular modes making no reference to the content of one or more images of the sequence.

Another solution, but which can also be combined with the previous one, consists not in skipping DTS decoding instants but in replacing images of the new or of the old stream by pre-encoded images of lower coding cost than that of the original images. For example, the first few images of type B of the new stream are replaced by type B images pre-encoded independently of the sequence. These replacements are done at the level of the TS layer. Specific modes of coding are used such as forward prediction with zero vectors of anticipated motion entailing for example the repetition of the intra image. This makes it possible moreover to eliminate the problem of the open GOPs for which the type B images may fetch, for their coding, a reference image of the preceding GOP. These B images thus coded are equivalent to type P images.

This technique makes it possible to decrease the time interval represented by the expression DTS_first_AUnew–PCRnew, by eliminating a number of TS packets which become unnecessary, the cost of coding the pre-encoded images being less than that of the original images.

This being done until the inequality reverses, leading to the first case.

Stuffing packets are added to the new stream, as indicated earlier, so as to obtain defect-free synchronization, that is to say synchronization which makes the DTS of the old stream correspond to the DTS of the new stream.

An operation similar to the above can also be performed but this time on the old stream. The last few images of type B of the old stream are replaced by images of type B, pre-encoded independently of the sequence. These replacements are made at the level of the TS layer. The same modes of coding as above may be used.

The result of this operation is the increasing of the time interval represented by the expression DTS_next_AUold–PCRold, by eliminating a number of TS packets which have become unnecessary, the cost of coding the pre-encoded images being less than that of the original images.

The two operations can also be combined, the objective always being to get back to the most favorable case, namely the first case.

State of Fill of the Buffer Memory of the Decoder.

The state of fill of the memory of the decoder must be monitored, a voiding or an overflow generating defects in the presentation of the image.

Let Rold be the bit rate of the old stream and Rnew the bit rate of the new stream.

First Case:

$$R_{old} (DTS\_next\_AUold-(image\ period)-PCRold) \geq R_{new} (DTS\_first\_AUnew-image\ period-PCRnew)$$

This amounts to saying, if we note that DTS_next_AUold−(image period) is the instant of exit, called Tout, from the buffer memory of the decoder of the last image of the old stream, that the number of bits of the new stream which are stored in the memory of the decoder, between the instant PCRnew and the instant Tout is less than or equal to the number of bits of the old stream which would have been stored between the instant PCRold and this instant Tout if this stream had continued to be transmitted.

Consequently, there is no risk of overflow.

Second Case:

$$R_{old} (DTS\_next\_AUold-(image\ period)-PCRold) < R_{new} (DTS\_first\_AUnew-image\ period-PCRnew)$$

The first image or first few images of the new stream are then replaced by pre-encoded images of smaller size so that the bit rate of the new stream corresponding to the useful data is decreased. One is therefore assured that there are no more useful bits which enter the decoder during the time interval corresponding to Tout−PCRnew than would have entered between the instants Tout and PCRold if the old stream had continued to be transmitted.

This operation is per formed in the case where it did not occur on account of synchronization problems, as indicated earlier, or would not be sufficient to ensure the above condition, the images chosen then having to be of even lower coding cost. It is this same operation which also makes it possible to eliminate the problem of the open GOPs.

It may also be observed that the state of fill of the buffer memory of the decoder is generally at a high level at the end of a GOP, a decoding of an I image, expensive in terms of coding bits, being imminent. Consequently, in order to decrease the risks of overflow, it is possible to reduce the fill level of the memory before the switching point. Consequently, another solution, but which may also be combined with the previous one, then consists in replacing the last few images of type B of the old stream by new pre-encoded images which are less expensive in terms of coding bits. The choice of pre-encoded images, or, in another way the reduction in the number of useful bits transmitted in the memory of the decoder, is also dependent on the difference between Rold (DTS_next_AUold−(image period)−PCRold) and Rnew (DTS_first_AUnew−image period−PCRnew). The saving in terms of coding bits achieved by replacing these images of the old stream makes it possible in fact to compensate for this difference. This is so, likewise, in the case where the operation has not been performed on account of synchronization problems or else would not be sufficient.

Finally, the solution consisting in offsetting the instant of decoding of the first image of the new stream by n image periods with respect to the instant DTS_next_AUold with generation of an "idle time" and insertion into the stream of pre-encoded images ensuring the decoding of an image at each image period, may turn out to be necessary in order to accomplish the monitoring of the state of fill of the buffer memory of the decoder.

The applications of the invention relate to the transmission and storage of programs, as well as to the insertion of advertisements or to regional or local handover.

What is claimed is:

1. Process for switching from an old MPEG data stream to a new MPEG data stream so as to obtain a switched stream, the point of exit in the old stream corresponding to the end of a data packet of a TS stream relating to the last image of the old stream and the point of entry in the new stream corresponding to the start of a data packet relating to the first image of the new stream, wherein PCRold (Program Clock Reference) and PCRnew being the clock instants relating respectively to the point of exit and point of entry, DTS_next_AUold (Decoding Time Stamp) and DTS_first_AUnew corresponding respectively to the calculated instant of decoding of the image following the last image of the old stream and the calculated instant of decoding of the first image of the new stream, a comparison is performed between the expressions $$DTS\_next\_AUold-PCRold\ and\ DTS\_first\_AUnew-PCRnew$$

and,
if:

$$DTS\_next\_AUold-PCRold < DTS\_first\_AUnew-PCRnew,$$

then, in a first step, the data of one or more last images of the old stream and/or one or more first images of the new stream are replaced by data of one or more new pre-encoded images of which the number is smaller so that the new value of PCRold and/or PCRnew thus obtained satisfies the relation:

$$DTS\_next\_AUold-PCRold \geq DTS\_first\_AUnew-PCRnew,$$

in a second step, if there is inequality, TS stuffing packets are inserted between the point of exit and the point of entry so as to make the decoding instants DTS_next_AUold and DTS_first_AUnew coincide, if:

$$DTS\_next\_AUold-PCRold > DTS\_first\_AUnew-PCRnew,$$

TS stuffing packets are inserted between the point of exit and the point of entry so as to make the decoding instants DTS next AUold and DTS_first_AUnew coincide.

2. Process for switching from an old MPEG data stream to a new MPEG data stream so as to obtain a switched stream, the point of exit in the old stream corresponding to the end of a data packet of a TS stream relating to the last image of the old stream and the point of entry in the new stream corresponding to the start of a data packet relating to the first image of the new stream, wherein PCRold (Program Clock Reference) and PCRnew being the clock instants relating respectively to the point of exit and point of entry, DTS_next_AUold (Decoding Time Stamp) and DTS_first_AUnew corresponding respectively to the calculated instant of decoding of the image following the last image transmitted of the old stream and the calculated instant of decoding of the first image of the new stream, a comparison is performed between the expressions $$DTS\_next\_AUold-PCRold\ and\ DTS\_first\_AUnew-PCRnew,$$

and, if:

$$DTS\_next\_AUold-PCRold < DTS\_first\_AUnew-PCRnew,$$

then, in a first step, the instant of decoding DTS_first_AUnew of the first image of the new stream is modified to the value DTS_next_AUold plus n times the image period, n being equal to:

$$1+\mathrm{INT}[((\mathrm{DTS\_first\_AUnew}-\mathrm{PCRnew})-(\mathrm{DTS\_next\_AUold}-\mathrm{PCRold}))/(\mathrm{image\ period})],$$

INT corresponding to the integer part, in a second step, if necessary, TS stuffing packets are inserted between the point of exit and the point of entry so as to make the decoding instants DTS_next_AUold and DTS_first_AUnew coincide modulo the image period, if:

$$\mathrm{DTS\_next\_AUold}-\mathrm{PCRold}>\mathrm{DTS\_first\_AUnew}-\mathrm{PCRnew},$$

TS stuffing packets are inserted between the point of exit and the point of entry so as to make the decoding instants DTS_next_AUold and DTS_first_AUnew coincide.

3. Process according to claim 2, wherein the modification of the instant of decoding of the images of the new stream is performed by allocating a corresponding offset to the DTS tag and to the PCR clock for the new stream.

4. Process according to claim 3, wherein n pre-encoded images are inserted before the first image of the new stream, whose size and whose allocated tags allow their decoding during the DTS instants skipped by the first image of the new stream.

5. Process according to claim 4, wherein stuffing packets are inserted into the stream so as to make the instants of decoding of the images inserted correspond to the skipped DTS instants.

6. Process according to claim 4, wherein a pre-encoded image is an image whose prediction error is zero.

7. Process according to claim 4, wherein a pre-encoded image is an image of intra type.

8. Process according to claim 1, wherein a pre-encoded image is an image whose prediction error is zero.

9. Process according to claim 1, wherein a pre-encoded image is an image of intra type.

10. Process according to claim 1, wherein the cost of the replacement pre-encoded images in the new stream is such that the number of bits of the new stream entering the memory of the decoder between the instant PCRnew and the instant DTS_first_AUnew−(image period) is less than or equal to the number of bits of the old stream which would have been stored in the memory of the decoder between the instant PCRold and DTS_next_AUold−(image period).

11. Process according to claim 10, wherein this difference takes into account, as appropriate, the difference in cost between the replaced images in the old steam and the original images of this old stream.

* * * * *